US012567928B2

(12) United States Patent (10) Patent No.: US 12,567,928 B2

Ram et al. (45) Date of Patent: Mar. 3, 2026

(54) COHERENT TRANSMISSION VIA MULTIPLE ANTENNAS

(71) Applicant: Gilat Satellite Networks Ltd., Petah Tikva (IL)

(72) Inventors: Uzi Ram, Givat Elah (IL); Guy Levitas, Rosh Ha'ayin (IL); Dubi Lever, Hashmonaim (IL); Assaf Levin, Mazkeret Batya (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 351 days.

(21) Appl. No.: 18/135,529

(22) Filed: Apr. 17, 2023

(65) Prior Publication Data

US 2023/0336300 A1 Oct. 19, 2023

Related U.S. Application Data

(60) Provisional application No. 63/340,742, filed on May 11, 2022, provisional application No. 63/332,043, filed on Apr. 18, 2022.

(51) Int. Cl.
H04L 5/00 (2006.01)
H04B 17/318 (2015.01)
H04W 72/0446 (2023.01)

(52) U.S. Cl.
CPC ......... H04L 5/0048 (2013.01); H04B 17/328 (2023.05); H04W 72/0446 (2013.01)

(58) Field of Classification Search
CPC .............. H04B 7/15507; H04B 7/185; H04B 7/18504; H04B 7/18508; H04B 7/1851;

H04B 7/18513; H04B 7/18515; H04B 7/18517; H04B 7/18519; H04B 7/18521; H04B 7/18523; H04B 7/18528; H04B 7/1853; H04B 7/18532; H04B 7/18536; H04B 7/18539; H04B 7/18541; H04B 7/18543; H04B 7/18552; H04B 7/18563; H04B 7/18567; H04B 7/18576; H04B 7/18578; H04B 7/18595; H04B 7/19;
(Continued)

(56) References Cited

U.S. PATENT DOCUMENTS 4,901,307 A * 2/1990 Gilhousen ............ H04B 7/2041
370/320
7,602,446 B2 * 10/2009 Ross ...................... H04N 5/265
348/584
(Continued)

FOREIGN PATENT DOCUMENTS

GB 2540776 * 2/2017

*Primary Examiner* — Frank Duong

(74) *Attorney, Agent, or Firm* — Banner & Witcoff, Ltd.

(57) ABSTRACT

In satellite communication systems, the cost of a terminal often corresponds to a maximum data rate that the terminal is required to transmit towards a satellite. The higher the data rate, the higher the Effective Isotropic Radiated Power (EIRP) the terminal may be required to radiate. The EIRP of the terminal is directly proportionate to the transmission power and to the effective area of the antenna. Using coherent transmission combining may facilitate a similar EIRP while reducing the cost of the terminal through using smaller antennas and lower radiated power. Methods, apparatuses, systems, and computer readable media are described herein for facilitating coherent combining of transmissions.

21 Claims, 6 Drawing Sheets

(58) Field of Classification Search
CPC ...... H04B 7/195; H04B 7/2041; H04B 7/216;
H04B 17/328; H04L 5/0048; H04H
40/90; H04W 84/06; H04W 72/0446
See application file for complete search history.

(56) References Cited

U.S. PATENT DOCUMENTS

| | | | | |
|---|---|---|---|---|
| 8,005,034 | B2 * | 8/2011 | Dankberg | H04B 7/1858 |
| | | | | 455/427 |
| 10,727,934 | B2 * | 7/2020 | Buer | H04B 7/18517 |
| 2010/0052986 | A1 * | 3/2010 | Nink | H01Q 21/29 |
| | | | | 342/372 |
| 2023/0050226 | A1 * | 2/2023 | Wyckoff | H04J 13/0077 |

* cited by examiner

400

Start

410

Transmit First
Synchronization
Transmission

420

Transmit Second
Synchronization
Transmission

430

Receive Time
Difference and
Phase Difference
Estimations

440

Determine
Corrected Second
Delay Value

450

Determine
Corrected Phase
Shift Value

460

Apply Corrected
Second Delay and
Phase Shift Values

End

500

Start

510
Transmit First
Synchronization
Transmission

520
Transmit Second
Synchronization
Transmission

525
Record
TX Time Difference

530
Receive
RX Time Difference

535
Receive
RX Phase
Difference

540
Calculate
Delay Error

545
Calculate
Phase Error

550
Adjust
Second Delay

555
Adjust
Phase Shift

End

600

COHERENT TRANSMISSION VIA MULTIPLE ANTENNAS

CROSS-REFERENCE TO RELATED APPLICATIONS

This application is related to and claims priority to U.S. Provisional Patent Application No. 63/332,043, filed Apr. 18, 2022, and U.S. Provisional Patent Application No. 63/340,742, filed May 11, 2022, each of which is hereby incorporated by reference in its entirety.

FIELD OF ART

Aspects of the disclosure pertain to the field of communications, including satellite communications.

BACKGROUND

In some applications, a terminal for satellite communication may include more than one antenna. In one example, the terminal may be operative over a geosynchronous orbit (GEO) satellite and may include two antennas, e.g., due to antenna size limitations or commercial benefits. In another example, two independent antennas are typically used in terminals operative over mean earth orbit (MEO) or low earth orbit (LEO) satellites. In such terminals, while one antenna tracks an operational satellite, a second antenna maneuvers to point at a next operational satellite, e.g., for facilitating a quick make-before-break handover.

In terminals operative over MEO or LEO satellites, the handover duration is short relative to the interval between handovers. Thus, most of the time (i.e. not during handovers), communication with an operational satellite (e.g. reception or transmission) can be sustained using one antenna, while the other antenna may either wait for a next handover to commence, or can be pointed to track the same operational satellite, which the one antenna tracks.

While two antennas track a same satellite, an RF carrier can be received via both antennas. Under such conditions, coherent combining of the two instances of the RF carrier received via the two antennas may be considered. Methods for tracking a phase between the two received instances (i.e. to enable coherent combining) are common knowledge and have straightforward implementations (as tracking a phase of a received signal is a basic functionality in any Demodulator). When the corresponding demodulated symbols associated with the two received instances of the RF carrier are coherently added, the combined RF signal may feature a signal to noise ratio (SNR) up to 3 dB higher than any of the two received instances alone.

In the other direction, coherent combining of transmissions has been done for many years, for example, in phased array antennas (PAAs). In a PAA, multiple patch antennas are arranged in a printed circuit board (PCB). Given a desired transmission direction relative to the PCB, phase shifters associated with the multiple patch antennas are set according to the distances between each antenna patch and a plane of the transmitted wave. At the desired transmission direction, all transmitted instances of the RF signal from the multiple antenna patches perform a constructive interference to form a coherent transmission of the RF signal.

Yet, coherent combining of RF signals being transmitted via two independent antennas (e.g., with the distance between the antennas (e.g., 10 m apart) being significantly larger than the wavelength of the RF signal and unknown at wavelength resolution), is a much more complicated task.

Setting the phase of each instance of the RF signal in accordance with the respective exact distance between each antenna and the satellite controls whether the interference between the transmitted instances is destructive or constructive. For example, the wavelength of an RF signal transmitted at a frequency of 30 GHz is 1 centimeter. At such wavelength, an error of even 5 millimeters (i.e. 0.5 centimeter) in antenna location turns a constructive interference into a destructive interference.

With the exact location of the satellite not known at wavelength resolution (e.g., even a GEO satellite constantly moves around its nominal position with actual location uncertainty of several kilometers), and where independent antennas placed at least several meters apart are used (their mutual distance being significantly larger than the transmission's wave length, and their exact locations unknown at wavelength resolution), coherent combining of transmissions sent via these antennas seems impossible. Clearly, under such conditions, there is no way to guarantee coherent combining while using straightforward transmission methods via such antennas.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to transmitting multiple transmissions from a terminal and towards a target satellite, wherein the multiple transmissions may be transmitted via multiple independent antennas, and wherein the multiple transmissions may form a coherent constructive interference (coherent combining), or an approximately coherent constructive interference, at the target satellite. In some embodiments, a coherent combining at the satellite of two transmissions may result in a combined transmission having signal to noise ratio (SNR) about 6 dB higher compared to the SNR of any of the transmissions alone, thus allowing an increase in transmission data rate from the terminal towards the satellite.

Aspects of the disclosure are directed to a method that may be used for achieving the constructive interference, or approximately achieving constructive interference having an associated improvement in SNR of the combined transmission signal as compared to the SNR of any of the individual transmissions. In some embodiments, the method may be used when the location of the multiple antennas and/or the location of the target satellite may be unknown, e.g. at least to a required level of precision corresponding to the transmissions' wavelength(s), and/or when the terminal and the target satellite may be in relative motion (e.g. due to motion of any of them).

BRIEF DESCRIPTION OF THE DRAWINGS

Figure 1:
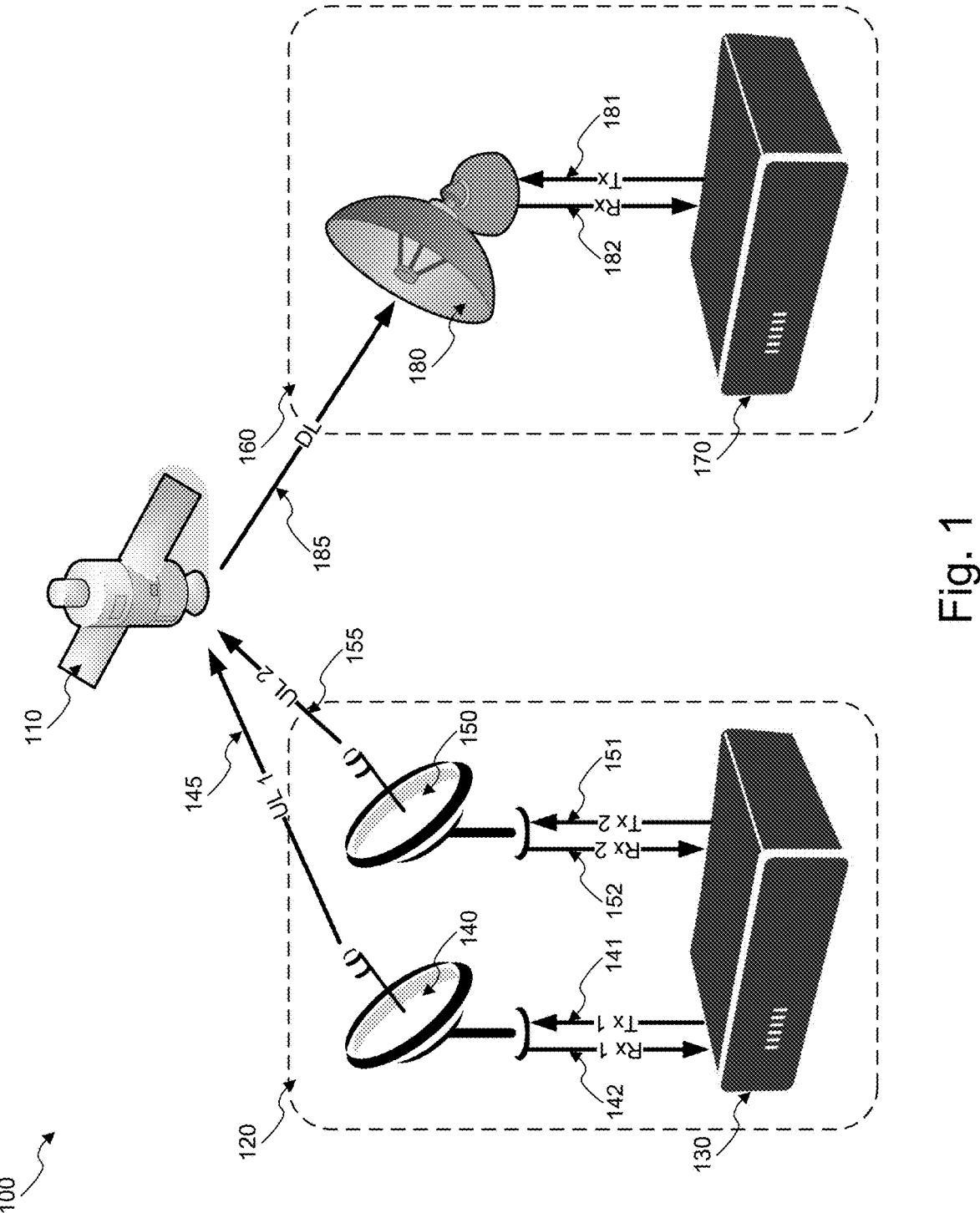

Having thus described the disclosure in general terms, reference will now be made to the accompanying drawings, which are not necessarily drawn to scale, and wherein:

FIG. 1 shows an example of a satellite communication network according to aspects of the disclosure.

Figure 2:
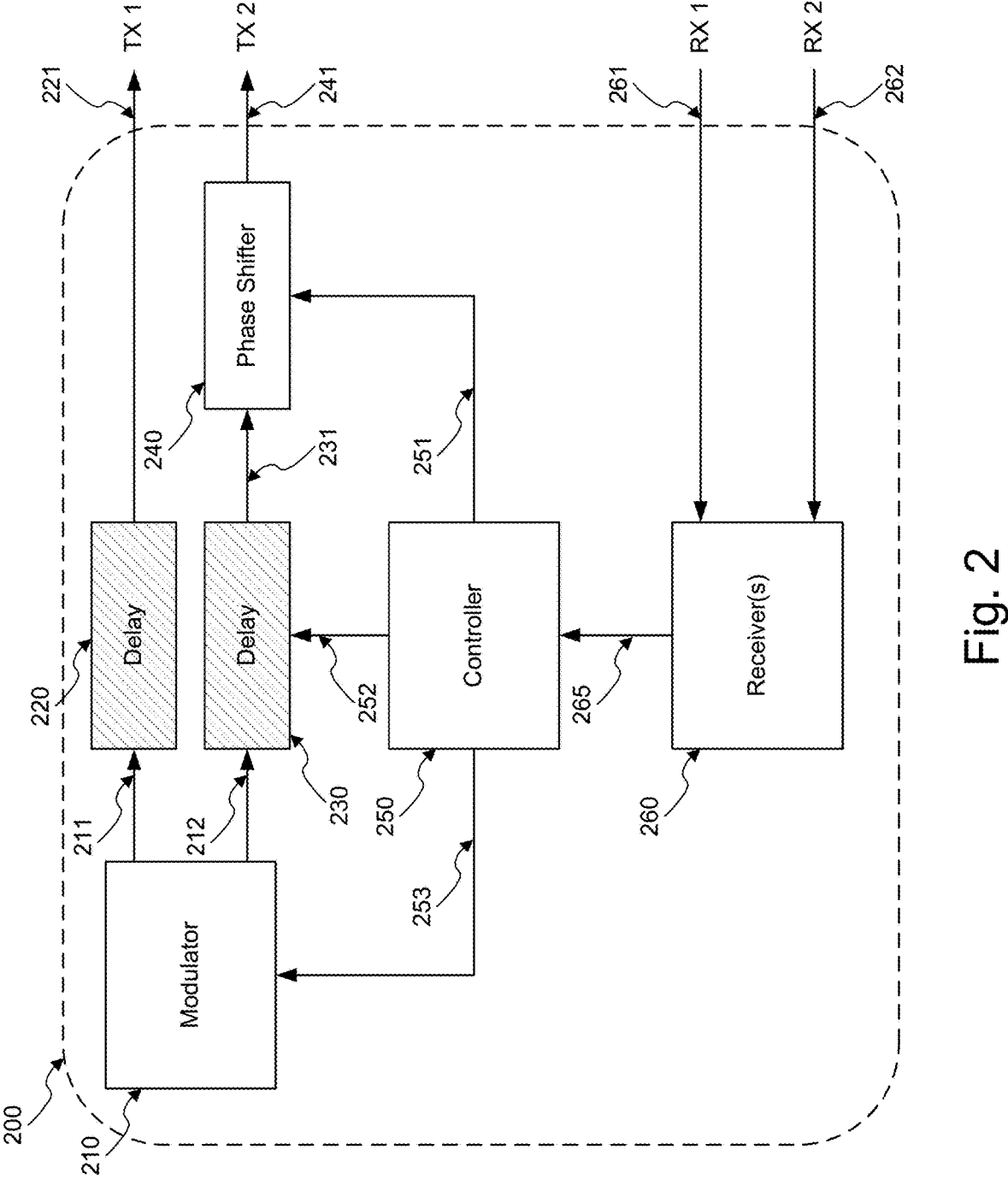

FIG. 2 shows an example block diagram of a modem in accordance with aspects of the disclosure.

Figure 3:
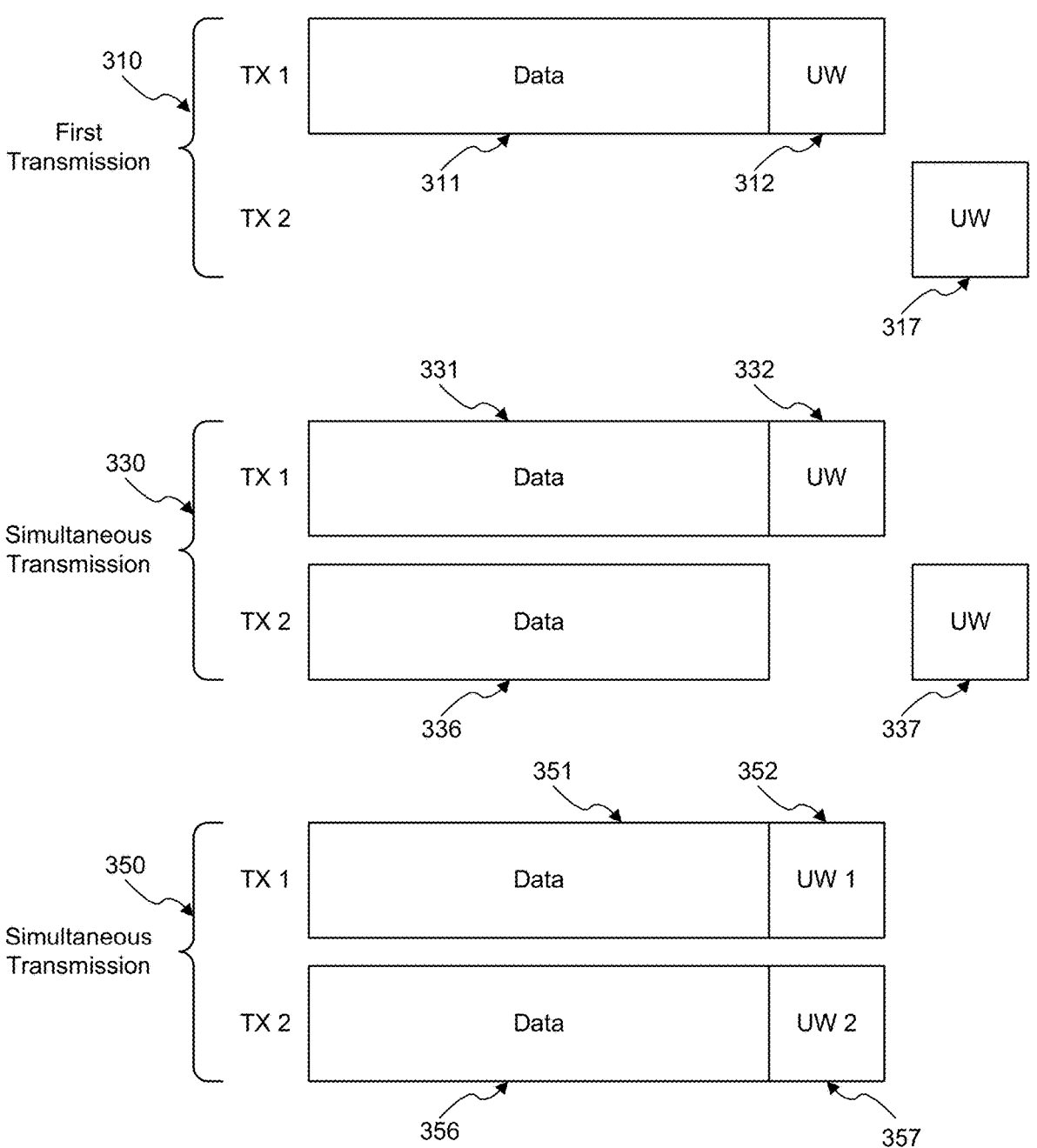

FIG. 3 shows example waveforms in accordance with aspects of the disclosure.

Figure 4:
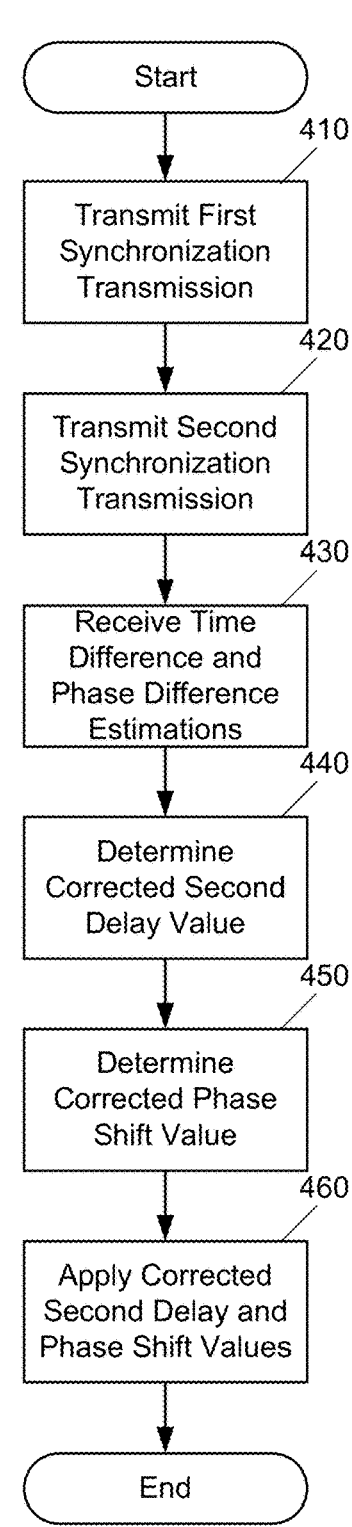

FIG. 4 shows an example flowchart of a method in accordance with aspects of the disclosure.

Figure 5:
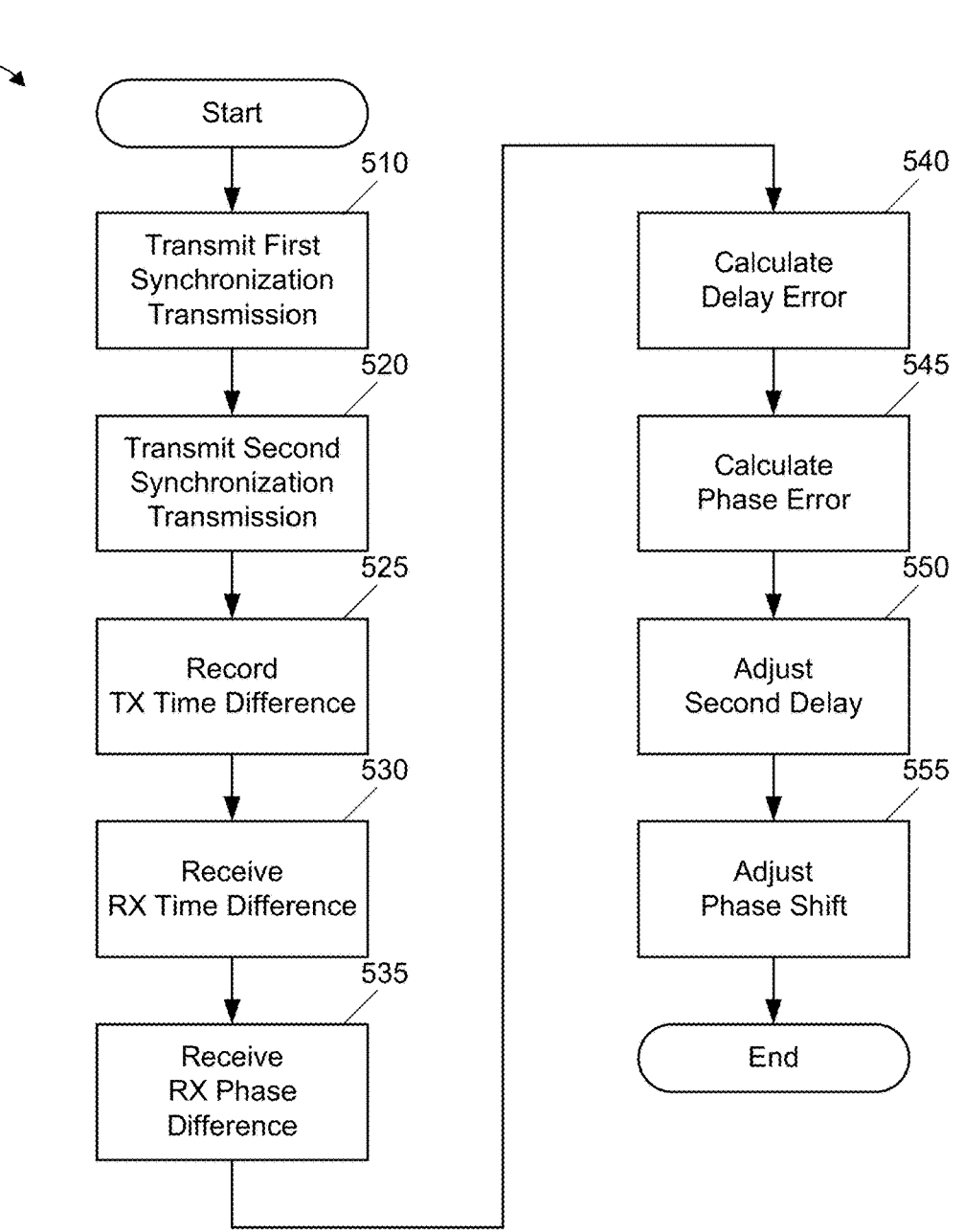

FIG. 5 shows an example flowchart of a method in accordance with aspects of the disclosure.

Figure 6:
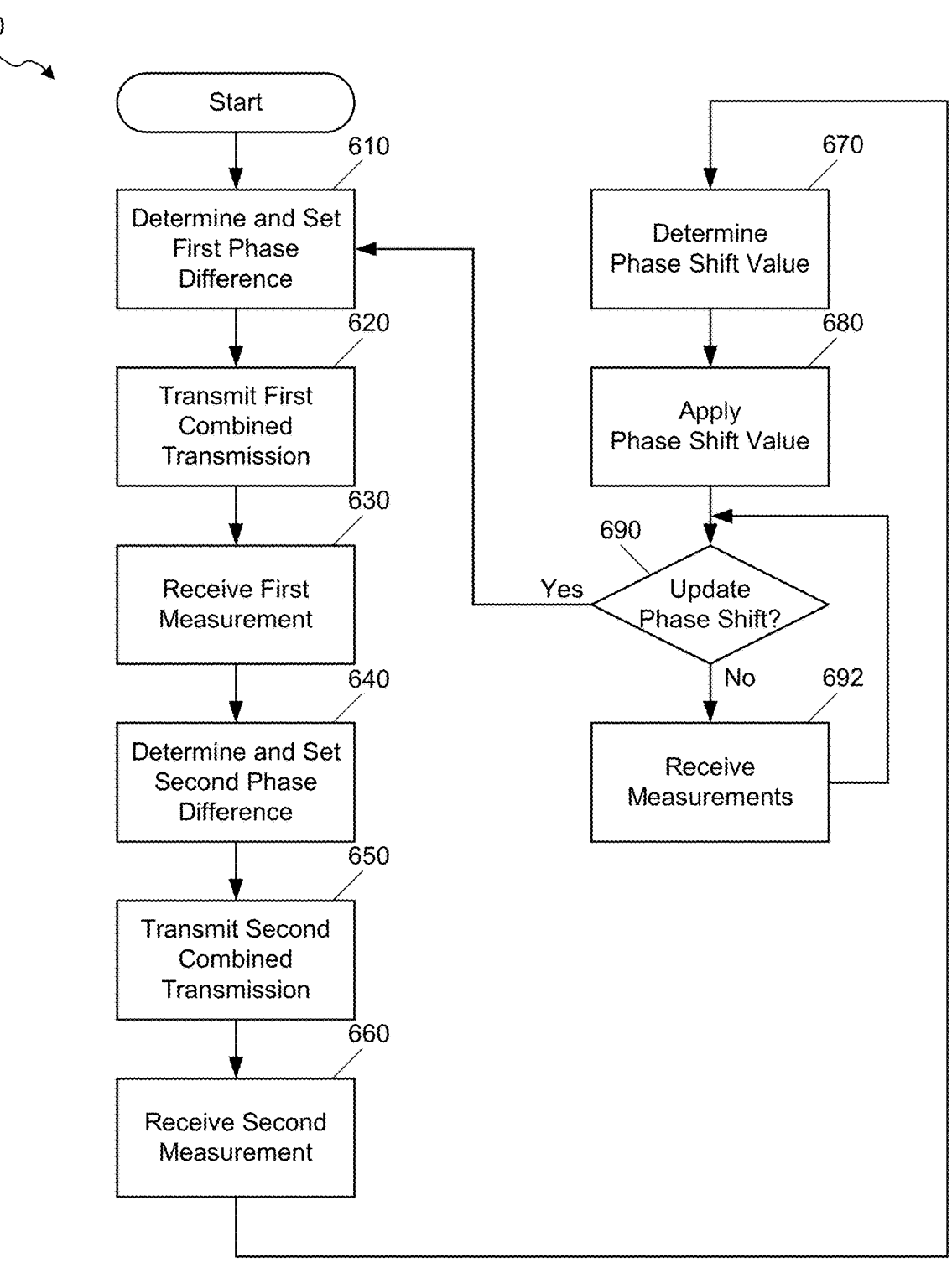

FIG. 6 shows an example flowchart of a method in accordance with aspects of the disclosure.

DETAILED DESCRIPTION

Referring to FIG. 1, a satellite communication system 100 may comprise a satellite 110 and at least a first earth station, the first earth station may comprise a terminal 120. The terminal 120 may comprise a modem 130, a first antenna 140 that may be coupled to a first transmit/receive (Tx/Rx) interface of the modem 130 (for example, via a transmit cable 141 and a receive cable 142), and a second antenna 150 that may be coupled to a second Tx/Rx interface of the modem 130 (for example, via a transmit cable 151 and a receive cable 152). In some embodiments, the first antenna 140 and/or the second antenna 150 may be dish antennas of similar properties. In some embodiments, the first antenna 140 and/or the second antenna 150 may differ in technology and/or in properties. Modem 130 may be configured to transmit an RF signal towards the satellite 110 using any of the first antenna 140 or the second antenna 150. Each transmit cable (e.g., 141 or 151) may carry an RF signal towards the corresponding antenna (e.g., 140 or 150, respectively), where the RF signal may be upconverted to an uplink frequency (e.g., in the Ka-band, or in any other band), amplified and radiated towards the satellite 110 as an uplink signal (e.g., uplink signals 145 or 155, respectively). In some embodiments, the modem 130 and the antenna assemblies (140, 150) may share a common reference clock signal, e.g. all synthesizers that may be used for frequency conversions, at the modem and/or at any of the antenna assemblies, may be locked on the same clock reference signal.

In some embodiments, the modem 130 may be configured to transmit a single RF signal at any given time, either via antenna 140 or via antenna 150. In some embodiments, antenna 140 and antenna 150 may be configured to point towards different satellites, and the modem 130 may be configured to simultaneously transmit two different RF signals, a first RF signal via antenna 140 and a second RF signal via antenna 150 (for example, to perform a handover of service from one satellite to another satellite).

In some embodiments, the satellite 110 may comprise onboard processing capabilities. Accordingly, the satellite 110 may comprise at least one receiver that may be configured to at least detect, demodulate and process an uplink signal, for example any of the uplink signals transmitted by terminal 120 (e.g. 145 or 155).

In some embodiments, the satellite 110 may be a bent-pipe satellite. In such embodiments, the satellite communication system may further comprise at least a second earth station. In some embodiments, the second earth station may comprise a gateway 160. The gateway 160 may comprise at least a gateway modem 170 and a gateway antenna 180 that may be coupled to a transmit/receive (Tx/Rx) interface of the gateway modem 170 (for example, via a transmit cable 181 and a receive cable 182). Accordingly, satellite 110 may be configured to receive an uplink signal (e.g. an uplink signal 145 or 155, transmitted by terminal 120), generate a corresponding downlink signal 185 (e.g. through amplification and frequency conversion), and transmit the downlink signal towards the gateway 160. At the gateway 160, the gateway modem 170 may be configured to detect, demodulate and process the downlink signal (e.g. after frequency down-conversion).

Referring to FIG. 2, a modem 200 is presented. In some embodiments, the modem 200 may be an example of the modem 130 (e.g. of FIG. 1). Modem 200 may comprise a modulator 210 configured to generate a first RF signal 211 and a second RF signal 212, wherein the first RF signal 211 and the second RF signal 212 may be generated at different times or simultaneously. In addition, the first RF signal 211 and the second RF signal 212 may be different RF signals or replicas of a same RF signal. In some embodiments, the modem 200 may be configured to use a first delay element 220, if present, to apply a first delay to the first RF signal 211 to generate a first transmitted RF signal 221 (Tx 1), or to generate the first transmitted RF signal 221 directly from the first RF signal 211 if the first delay element 220 is not present. In some embodiments, the modem 200 may be configured to use a second delay element 230 to apply a second delay to the second RF signal 212 to generate a delayed second RF signal 231. The modem 200 may be configured to use a phase shifter 240 to apply a phase shift (phase rotation) to the delayed second RF signal 231 if the second delay element 230 is present, or to the second RF signal 212 if the second delay element is not present, to generate a second transmitted RF signal 241 (Tx 2). In some embodiments, the modem 200 may further comprise one or more receivers 260 (e.g. configured to receive any of a first received signal 261 and/or a second received signal 262) and a controller 250.

In some embodiments, the modulator 210 may be configured to generate the first RF signal 211 and the second RF signal 212 as analog signals, wherein the first delay element 220 (if present), the second delay element 230 (if present) and the phase shifter 240 may be configured for use on analog signals. In some embodiments, the modulator 210 may be configured to generate the first RF signal 211 and the second RF signal 212 as digital signals, e.g. represented by digital samples, wherein the first delay element 220 (if present), the second delay element 230 (if present) and the phase shifter 240 may be configured for use on digitally sampled signals, e.g., through means of digital signal processing. For example, any of the modulator 210, the first delay element 220, the second delay element 230 and the phase shifter 240 may be implemented in a field programmable gate array (FPGA). In such embodiments, the modem 200 may further comprise a first digital to analog converter (DAC) coupled to the first delay element 220 if present, or to the modulator (210) if the first delay element 220 is not present (e.g. to produce the first transmitted RF signal 221), and a second DAC coupled to the phase shifter 240 (e.g. to produce the second transmitted signal 241) (both not shown in FIG. 2).

For further references, the path configured to generate the first transmitted RF signal 221, comprising at least the first RF signal 211 and possibly the first delay element 220, will be referred to as the modem's first transmission channel. Similarly, the path configured to generate the second transmitted RF signal 241, comprising at least the second RF signal 212, the phase shifter 240 and possibly the second delay element 230, will be referred to as the modem's second transmission channel.

Achieving constructive interference (coherent combining) between two received uplink signals (e.g., 145, 155) may require both timing coherency, for example up to a (small) fraction of a duration of a modulated symbol, and phase coherency, for example up to several degrees (e.g., 20 degrees). To achieve and/or maintain timing coherency (for example, when the terminal 120 may be in motion relative to the satellite 110) and/or phase coherency, the modem (130, 200) may be configured to possibly apply a first delay (220) for generating the first replica of the RF signal (221), apply a second delay (230) and a phase shift (240) for generating the second replica of the RF signal (241), so that the corresponding first uplink signal (145) and the second uplink signal (155) may be coherently combined (through constructive interference) upon arriving at the satellite (110). In some embodiments, the modem (130, 200) may be configured to apply a constant first delay (or no first delay) for generating the first replica of the RF signal (221), and/or apply a variable second delay (230) for generating the second replica of the RF signal (241). In some embodiments, the second delay (230) and the phase shift (240) may vary, for example, according to control signals (e.g., 252 and 251) that may be generated by the modem's controller 250, e.g. to control the second delay element 230 and the phase shifter 240 (respectively).

Referring to FIG. 4, the modem (130, 200) may be configured to transmit a first synchronization transmission (410) via the first antenna (140), for example as a first uplink signal (145). The modem (130, 200) may be configured, e.g., after concluding the transmitting of the first synchronization transmission, to transmit a second synchronization transmission (420) via the second antenna (150), for example as a second uplink signal (155). In some embodiments, the satellite (110) may comprise onboard processing capabilities including a receiver. The receiver at the satellite (110) may be configured to receive (e.g., detect, and demodulate) the first synchronization transmission (e.g. as the first uplink signal), receive (e.g., detect and demodulate) the second synchronization transmission (e.g. as the second uplink signal), estimate (or measure) a time difference between receiving the first synchronization transmission and receiving the second synchronization transmission, and estimate (or measure) a phase difference between the received first synchronization transmission and the received second synchronization transmission. The satellite (110) may be configured to transmit information corresponding to any of the estimated time difference and the estimated phase difference to the terminal (120), where it may be received (430) by the terminal's modem (130, 200) (for example, using the modem's receiver (260), which may be configured to forward the received information (265) to the modem's controller (250)). The modem's controller (250) may be configured to receive (430) at least a time difference estimation and a phase difference estimation that may correspond to the first synchronization transmission and the second synchronization transmission, determine a corrected second delay value in accordance with the received time difference estimation (440), determine a corrected phase shift value in accordance with the received phase estimation value (450), apply (460) the corrected second delay value (252) to the second delay element (230), and apply (460) the corrected phase shift value (251) to the phase shifter (240).

In some embodiments, the satellite 110 may be a bent-pipe satellite. In such embodiments, a receiver, which may be configured to receive the first synchronization transmission and the second synchronization transmission, may be located at a gateway 160. For example, the receiver may be included in the gateway modem 170. The receiver may be configured to receive the synchronization transmissions and to estimate the time difference and the phase difference, for example as described above, and the gateway modem (170)

may be configured to transmit the information corresponding to said estimations to the terminal (120) via the satellite (110).

According to aspects of the disclosure, the first antenna (e.g., antenna 140) and the second antenna (e.g., antenna 150) may be configured to point towards a same satellite (e.g., satellite 110), and a modem coupled to the first antenna and to the second antenna (e.g. modem 130 that may comprise, or that may be implemented with, the modem 200) may be configured to transmit a first replica of an RF signal (221) via the first antenna (140) as a first uplink signal (145), and a second replica of the RF signal (241) via the second antenna (150) as a second uplink signal (155), possibly at about a same time (e.g., at overlapping times), wherein the first uplink signal (145) and the second uplink signal (155) may constructively interfere with each other, e.g. upon arrival (reception) at the satellite (110). In some embodiments, said constructive interference may generate a combined signal having an SNR that is approximately 6 dB higher than the SNR of the first uplink signal and/or the SNR of the second uplink signal.

Initially, the modem (130, 200) might not simultaneously transmit the first uplink signal (145) and the second uplink signal (155) towards the satellite (110), since any of a time difference and a phase difference between the first uplink signal (145) and the second uplink signal (155) may be unknown at least to a level of accuracy that may be required for achieving coherent combining (e.g. through constructive interference). Simultaneous transmission of both uplink signals at this stage may result in a destructive interference, which may render the combined signal undetectable by the receiver (whether onboard the satellite 110 or at the gateway 160).

Referring to FIG. 3 and to FIG. 5, the modem (130, 200) may be configured to initialize coherent combining, for example by applying method 500 to transmitting a first transmission 310. The first transmission 310 may comprise at least a first synchronization transmission 312 that may be transmitted (510) only via the modem's first transmission channel and via the first antenna (140), and a second synchronization transmission 317 that may be transmitted (520) only via the modem's second transmission channel and via the second antenna (150). The second synchronization transmission 317 may be transmitted after concluding the transmitting of the first synchronization transmission 312, and the modem (130, 200) may be configured to record (525) a time difference between transmitting the first synchronization transmission 312 and transmitting the second synchronization transmission 317. In some embodiments, the first synchronization transmission 312 may comprise a known, pseudo random sequence of symbols, usually denoted as a unique word (UW), the second synchronization transmission 317 may also comprise a UW, and the recorded time difference between the two transmissions may correspond to the time difference between the transmitting of the respective UWs. In some embodiments, the first synchronization transmission 312 and the second synchronization transmission 317 may comprise a same sequence of symbols, e.g. a same UW. In some embodiments, initializing coherent combining may take place while the terminal is operational (e.g., transmits data, such as payload data different from control data used for synchronization), thus the first synchronization transmission 312 may immediately follow a data burst transmission 311 (e.g., including payload data), which may also be transmitted only via the first transmission channel and via the first antenna (140).

As previously described, a receiver (e.g., either at the satellite (if the satellite has onboard processing capability), or at a second earth station, such as a gateway 160) may receive the first synchronization transmission 312, wherein the receiving may comprise at least demodulating the first synchronization transmission 312 and passing the demodulated first synchronization transmission through a correlator (e.g. which may be included in the receiver) that may be matched to the UW included in the first synchronization transmission 312. In some embodiments, the receiver may be configured to process the received synchronization transmissions at Complex Baseband, hence the correlator may output correlation results as complex samples, for example at a resolution equivalent to a small fraction of a symbol duration. Hence, each correlation result may correspond to a correlation amplitude and a correlation phase. In such embodiments, the receiver may be configured to obtain, from the correlator, a first correlation (amplitude) peak (sample) corresponding to the receiving of the UW included in the first synchronization transmission 312, and record a first time property (e.g. in a resolution of a small fraction of a symbol) and a first phase property corresponding to the first correlation peak (sample).

Similarly, the receiver may receive the second synchronization transmission 317, obtain a second correlation peak (sample) corresponding to the receiving of the UW included in the second synchronization transmission 317, and record a second time property and a second phase property corresponding to the second correlation peak (sample). The receiver may be configured to calculate a time difference between the second time property and the first time property and calculate a phase difference between the second phase property and the first phase property. The receiver (e.g. via its hosting platform, e.g. either the satellite or the gateway, as previously mentioned) may be configured to transmit the calculated time difference and the calculated phase difference to the terminal (120).

The terminal's modem (130, 200) may be configured to, upon receiving the calculated time difference (530) and the calculated phase difference (535) (e.g. from the receiver), calculate a delay error (540) and a phase error (545). The modem (130, 200) may be configured to calculate the delay error (540) as the difference between the received calculated time difference (530) (e.g., which may correspond to the time difference at reception of the two synchronization transmissions) and the recorded time difference (525) (which may correspond to the time difference at transmitting of the two synchronization transmissions). The modem (130, 200) may be configured to calculate the phase error (545) to be the same as the received calculated phase difference (535). The modem (130, 200) may be configured to adjust the second delay (550) in accordance with the calculated delay error (540) (e.g. by subtracting the delay error from the second delay value to produce an updated second delay value), and adjust the phase shift (555) in accordance with the calculated phase error (545) (e.g. by subtracting the phase error from the phase shift value to produce an updated phase shift value).

Once the second delay and the phase shift are updated in accordance with the information received from the receiver, the initializing of coherent combining may be concluded. The modem (130, 200) may then simultaneously transmit a first replica of an RF signal, via its first transmission channel and via the first antenna (140), and a second replica of the RF signal, via its second transmission channel and via the second antenna (150). As a result of the coherent combining initialization, the corresponding uplink signals (145, 155) will constructively interfere upon arrival at the satellite (110) to form coherent combining.

Referring to FIG. 3, two examples of simultaneous transmission via both the first transmission channel (and via the first antenna (140)) and the second transmission channel (and via the second antenna (150)), are presented. According to a first example 330, the modem (130, 200) may be configured to simultaneously transmit two replicas, 331 and 336, of a data transmission burst, a first replica 331 via the first transmission channel and a second replica 336 via the second transmission channel (the uplink signals corresponding to the replicas 331 and 336 may be coherently combined, as previously mentioned). The modem (130, 200) may be configured to, upon concluding the transmitting of the data transmission burst (e.g. simultaneously at both transmission channels), repeat the method 500 previously described. For example, the modem (130, 200) may transmit a first synchronization transmission 332 (510) comprising a UW only via the first transmission channel (and via the first antenna (140)), and transmit a second synchronization transmission 337 (520) comprising the same UW only via the second transmission channel (and via the second antenna (150)) after concluding the transmitting of the first synchronization transmission 332. It may also record a time difference (525) between transmitting the first synchronization transmission 332 and transmitting the second synchronization transmission 337, receive (e.g. from a receiver in a satellite or in a gateway, as previously described, a message including information corresponding to) a calculated time difference (530) and a calculated phase difference (535) corresponding to the first synchronization transmission 332 and to the second synchronization transmission 337. Further, it may calculate a delay error corresponding to the received calculated time difference and the recorded time difference (540), calculate a phase error corresponding to the received phase difference (545), and adjust the second delay (230) in accordance with the calculated delay error (550) or the phase shift (240) in accordance with the calculated phase error (555). The modem may be configured to periodically repeat the method of FIG. 5 in order to track changes in timing and phase, for at least the purpose of maintaining combining coherency. In some embodiments, such changes may result from changes in the satellite position. For example, by repeating the method of FIG. 5 at intervals of approximately 300 mSec (or similar intervals that are longer than the round trip delay so that information received from a satellite or another gateway can be implemented before the next synchronization transmission), combining coherency may be maintained even if the satellite is at medium earth orbit (MEO). In some embodiments, changes in timing and phase may result from movement of the terminal 120.

Referring to FIG. 3, according to a second example of simultaneous transmission 350, the modem (130, 200) may be configured to simultaneously transmit two replicas, 351 and 356, of a data transmission burst, a first replica 351 via the first transmission channel and a second replica 356 via the second transmission channel (the uplink signals corresponding to the replicas 351 and 356 may be coherently combined, as previously mentioned). The modem (130, 200) may be configured to, upon concluding the transmitting of the data transmission burst (e.g. simultaneously at both transmission channels), repeat the method 500 previously described but with one difference. In the second example, the modem (130, 200) may be configured to simultaneously transmit a first synchronization transmission 352 (510) comprising a first UW via the first transmission channel (and via the first antenna (140)) and a second synchronization transmission 357 (520) comprising a second UW via the second transmission channel (and via the second antenna (150)). Because the two synchronization transmissions may be simultaneously transmitted, the recorded time difference between them may be zero (525). In some embodiments, the first UW and the second UW may be different UWs, for example nearly orthogonal UWs. At the receiver (e.g. at the satellite or at the gateway, as previously described), the signal comprising the combined synchronization transmissions (352, 357) may be demodulated and passed in parallel through two correlators (e.g. which may be included in the receiver): a first correlator that may be matched to the first UW included in the first synchronization transmission 352, and a second correlator that may be matched to the second UW included in the second synchronization transmission 357. Since the first UW and the second UW may be nearly orthogonal, a first correlation peak obtained from the first correlator may correspond mostly to the first UW, and a second correlation peak obtained from the second correlator may correspond mostly to the second UW. As previously described, the receiver may be configured to calculate a time difference and a phase difference between the second correlation peak and the first correlation peak, and (e.g. via its hosting platform, e.g. either the satellite or the gateway, as previously mentioned) transmit the calculated time difference and the calculated phase difference to the terminal (120). The modem (130, 200), upon receiving the calculated time difference and the calculated phase difference, may perform the remaining steps of the method described in FIG. 5.

The propagation delay may be defined as the delay inflicted upon a transmitted RF signal (e.g., 221 or 241) between the output of the modem and the satellite 110. For example, the propagation delay may comprise at least the transmission cable (e.g., 141 or 151) delay and the uplink propagation delay (e.g., 145 or 155, respectively). In some embodiments, the terminal 120 may be configured so that the maximum difference between the propagation delay inflicted upon the first transmitted RF signal (221) and the propagation delay inflicted upon the second transmitted RF signal (241) may be significantly lower than a duration of a transmission symbol. In such embodiments, any of the first delay element (220) and the second delay element (230) may not be present in modem 200 (or if present may be unused, for example, inflicting no delay). In such embodiments, the modem (130, 200) may be configured to perform methods similar to those previously described, but perhaps to skip one or more steps concerning the delay difference between the transmission channels. For example, the modem (130, 200) may be configured to perform a method similar to method 400, wherein in the similar method step 430 may include receiving only a phase difference estimation, step 440 may be skipped, and step 460 may comprise only the applying of a corrected phase shift value. In another example, the modem (130, 200) may be configured to perform a method similar to method 500, wherein in the similar method any of the steps 525, 530, 540 and 550 may be skipped.

In some other embodiments, where the terminal 120 may be configured so that the maximum difference between the propagation delay inflicted upon the first transmitted RF signal (221) and the propagation delay inflicted upon the second transmitted RF signal (241) may be significantly lower than a duration of a transmission symbol, the modem (130, 200) may comprise the first delay element (220) and the second delay element (230), and may be configured to employ the similar method 400 and/or the similar method 500 when transmitting at low symbol rates (e.g., when the duration of a transmission symbol is relatively long), and to employ the method 400 and/or the method 500 when transmitting at high symbol rates.

In some embodiments, for example, where the maximum difference between the propagation delay inflicted upon the first transmitted RF signal (221) and the propagation delay inflicted upon the second transmitted RF signal (241) may be significantly lower than a duration of a transmission symbol, coherent combining may be achieved while the terminal may be configured to receive, e.g., from the receiver (e.g., either at the satellite or at a second earth station, as previously mentioned) any of Signal to Noise Ratio (SNR) measurements or Received Signal Strength Indication (RSSI) measurements. In such embodiments, any of the first delay element (220) and the second delay element (230) may not be present in modem 200 (or if present may be unused, for example, configured to inflict no delay).

Referring to FIG. 6, the modem (130, 200) may be configured to determine a first phase difference between a signal to go through the first transmission channel and a signal to go through the second transmission channel and set the phase shifter (240) in accordance with the first phase difference (610). The modem (130, 200) may be configured to transmit a first combined transmission (620) based on the first phase difference, wherein transmitting a combined transmission (for example, any of the first combined transmission and the second combined transmission described herein) may comprise transmitting, at about a same time (e.g. simultaneously or at overlapping times), a first replica of an RF signal via the modem's first transmission channel (and via the first antenna (140)) and a second replica of the RF signal via the modem's second transmission channel (and via the second antenna (150)). The modem (130, 200) may be configured to receive (e.g., from the receiver) a first measurement (630) corresponding to the first combined transmission, wherein a measurement (for example, any of the first measurement and the second measurement described herein) may comprise any of an SNR measurement, an RSSI measurement, or any other measurement that may be indicative of a reception quality of the first combined transmission. The modem (130, 200) may be configured to determine a second phase difference between a signal to go through the first transmission channel and a signal to go through the second transmission channel and set the phase shifter (240) in accordance with the second phase difference (640), wherein the second phase difference may be different from the first phase difference. The modem (130, 200) may be configured to transmit a second combined transmission (650) based on the second phase difference, receive (e.g., from the receiver) a second measurement (e.g., reception quality measurement) (660) corresponding to the second combined transmission, determine a phase shift value (670) in accordance with at least the first measurement and the second measurement and apply the phase shift value (e.g., set the phase shifter (240) in accordance with the determined phase shift value) (680).

For example, the first measurement may be an SNR measurement or an RSSI measurement of a value M1, the second measurement may be an SNR measurement or an RSSI measurement of a value M2 and determining the phase shift value may comprise determining whether M1 is higher than M2 or lower than M2. If M1 is higher than M2, the phase shift value may be determined to be closer to a first phase shift value (e.g. corresponding to the first phase difference) than to the second phase shift value (e.g. corresponding to the second phase difference). If M1 is lower than M2, the phase shift value may be determined to be closer to the second phase shift value than to the first phase shift value. In some embodiments, the phase shift value may be determined also in accordance with a previous phase shift value. In such embodiments, the phase shift value may be (slightly) changed (e.g. compared to the previous phase shift value) towards the first phase shift value or towards the second phase shift value, whichever may be associated with a higher (better) SNR measurement or an RSSI measurement. For example, if M1 is higher than M2, the phase shift value may be a predefined number of degrees off the previous phase shift value in the direction of the first phase shift value, and if M1 is lower than M2, the phase shift value may be a predefined number of degrees off the previous phase shift value in the direction of the second phase shift value.

The modem (130, 200) may be configured to, once the phase shift value has been applied (680), receive one or more additional measurements (e.g. from the receiver) (692) and determine (690) whether updating the phase shift value may be required or desired, wherein updating the phase shift value may comprise repeating steps 610 to 680, as previously described. For example, the modem (130, 200) may be configured to periodically update the phase shift value, e.g., at predefined intervals. In another example, the modem (130, 200) may be configured to determine that updating the phase shift value may be required or desired upon detecting, based on the received one or more additional measurements (692), a decline in reception quality (e.g., SNR or RSSI), e.g., that may be attributed to a degradation in combining coherency. In both examples, the modem (130, 200) may determine a first phase shift (610) that may be a first predefined number of degrees (first phase offset) off the phase shift value in one direction, and determine a second phase shift (640) that may be a second predefined number of degrees (second phase offset) off the phase shift value in a second direction opposite to the one direction (in some examples, the second phase offset may be of the same magnitude as the first phase offset). The modem (130, 200) may be configured to, once it obtains the first measurement (630) and the second measurement (660), to determine an updated phase shift value in accordance with any of the first measurement, the second measurement and the phase shift value, for example, as previously described.

According to aspects of the disclosure, in a satellite communication system comprising a satellite and at least a first earth station, the first earth station comprising a terminal configured to transmit a plurality of uplink signals via a corresponding plurality of antennas, a method for coherent combining of the plurality of uplink signals upon arriving at the satellite is presented.

The terminal may comprise a modem, the modem comprising a plurality of transmit/receive (Tx/Rx) interfaces, and a same plurality of antennas, wherein each antenna of the plurality of antennas may be coupled to a corresponding Tx/Rx interface of the plurality of Tx/Rx interfaces, and wherein the plurality of antennas may be configured to point towards the satellite. In some embodiments, at least a subset of the plurality of antennas may be configured to point towards the satellite (for example, while other antennas may be configured to point at another satellite). The modem may comprise at least a modulator configured to generate a plurality of RF signals. The modem may comprise a plurality of transmission channels (e.g., corresponding to the plurality of Tx/Rx interfaces) coupled to the modulator, wherein each transmission channel may be configured to produce a transmitted RF signal corresponding to a respective RF signal of the plurality of RF signals. A first transmission channel of the plurality of transmission channels may comprise at least a first delay element. Each transmission channel of the plurality of transmission channels but the first transmission channel may comprise at least a delay element and a phase shifter.

The modem may be configured to transmit a plurality of replicas of an RF signal via the plurality of transmission channels and via the corresponding plurality of antennas (e.g. one replica per each transmission channel and a corresponding antenna), e.g. as a plurality of uplink signals, wherein the plurality of uplink signals may constructively interfere upon arrival at the satellite.

Initially, the modem may not simultaneously transmit more than one uplink signal of the plurality of uplink signals towards the satellite, since any of a time difference and a phase difference between any two uplink signals of the plurality of uplink signals may be unknown at least to a level of accuracy that may be required for achieving coherent combining (e.g. through constructive interference). Hence, the modem may be configured to initialize coherent combining, for example by applying a method similar to method 500. In some embodiments, the modem may transmit a first synchronization transmission only via its first transmission channel (and a first antenna corresponding to the first transmission channel). The modem may be configured to, for each of the plurality of transmission channels but the first transmission channel, transmit a kth synchronization transmission (e.g. k>1) only via its kth transmission channel (and a kth antenna corresponding to the kth transmission channel), wherein the kth synchronization transmission may be transmitted after concluding the transmitting of the k−1th synchronization transmission, and wherein the modem may be configured to record a time difference between transmitting the first synchronization transmission and transmitting the kth synchronization transmission. In some embodiments, each of the synchronization transmissions may comprise a UW, and the recorded time difference between the transmitting of the first synchronization transmission and the transmitting of any of a kth synchronization transmission may correspond to the time difference between the transmitting of the respective UWs. In some embodiments, all the synchronization transmissions may comprise a same UW. In some embodiments, initializing coherent combining may take place while the terminal is operational (e.g., transmits data, such as payload data), thus the first synchronization transmission may immediately follow a data burst transmission, which may also be transmitted only via the first transmission channel (and a first antenna corresponding to the first transmission channel).

As previously described, a receiver may receive the synchronization transmissions, detect the UW in each of the received synchronization transmissions and based on said detection calculate, for each of the received synchronization transmissions but the first received synchronization transmission, a time difference and a phase difference relative to the first received synchronization transmission. The receiver (e.g. via its hosting platform) may be configured to transmit the calculated time differences and the calculated phase differences to the terminal's modem.

The terminal's modem may be configured to, upon receiving the calculated time differences and the calculated phase differences (e.g. from the receiver), calculate a delay error and a phase error corresponding to the respective transmission channels (e.g. the plurality of transmission channels but the first transmission channel). The modem may be configured to calculate a delay error for a kth transmission channel as the difference between the received calculated time difference for the kth synchronization transmission and the recorded time difference for the kth synchronization transmission. The modem may be configured to calculate a phase error for a kth transmission channel to be the same as the received calculated phase difference for the kth synchronization transmission. The modem may be configured to adjust the delay of the kth transmission channel in accordance with the calculated kth delay error (e.g. by subtracting the delay error from the delay value to produce an updated delay value), and adjust the phase shift of the kth transmission channel in accordance with the calculated kth phase error (e.g. by subtracting the phase error from the phase shift value to produce an updated phase shift value).

Once all delays and phase shifts are updated in accordance with the information received from the receiver, the initializing of coherent combining may be concluded. The modem may then simultaneously transmit a plurality of replicas of an RF signal via the plurality of transmission channels (and the plurality of antennas corresponding to the plurality of transmission channels), as the corresponding uplink signals will constructively interfere upon arrival at the satellite to form coherent combining. According to a first example of simultaneous transmission, the modem may be configured to simultaneously transmit the plurality of replicas of a data transmission burst (e.g. one replica via each transmission channel), and upon concluding the transmitting of the data transmission burst (e.g. simultaneously at all transmission channels) repeat the method described above. The modem may be configured to periodically repeat that method in order to track changes in timing and phase, for at least the purpose of maintaining coherent combining. According to a second example of simultaneous transmission, the modem may be configured to simultaneously transmit the plurality of replicas of the data transmission burst (e.g., one replica via each transmission channel), and upon concluding the transmitting of the data transmission burst (e.g. simultaneously at both transmission channels) repeat the method described above but with one difference. In the second example, the modem may be configured to simultaneously transmit the plurality of synchronization transmissions, wherein a synchronization transmission may comprise a UW different from any UW included in any of the other synchronization transmissions of the plurality of synchronization transmissions. For example, the plurality of UWs may be (nearly) orthogonal UWs.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. An apparatus comprising:
   a modulator;
   a first transmission channel configured to couple the modulator to a first antenna pointed at a satellite; and
   a second transmission channel comprising at least a phase shifter and configured to couple the modulator to a second antenna pointed at the satellite,
   wherein the apparatus is configured to:
      transmit a first combined transmission having a first phase difference;
      receive a first measurement of the first combined transmission;
      transmit a second combined transmission having a second phase difference;
      receive a second measurement of the second combined transmission;
      determine a phase shift value based on at least one of the first measurement or the second measurement; and
      set the phase shifter based on the phase shift value.

2. The apparatus of claim 1,
   wherein the modulator is configured to generate a first radio frequency (RF) signal and;
   a second RF signal,
   wherein the apparatus is configured to transmit the first combined transmission by:
      transmitting a first replica of the first RF signal via the first transmission channel, and
      transmitting a second replica of the first RF signal via the second transmission channel, and
   wherein the apparatus is configured to transmit the second combined transmission by:
      transmitting a first replica of the second RF signal via the first transmission channel, and
      transmitting a second replica of the second RF signal via the second transmission channel.

3. The apparatus of claim 1, further comprising a controller configured to determine the phase shift value.

4. The apparatus of claim 1, wherein:
   the second phase difference is different from the first phase difference; and
   the first measurement or the second measurement comprises a Signal to Noise Ratio (SNR) measurement or a Received Signal Strength Indication (RSSI) measurement.

5. The apparatus of claim 1, wherein the apparatus is configured to determine the phase shift value by:
   determining whether the first measurement is higher than the second measurement; and
   determining, if the first measurement is higher than the second measurement, that the phase shift value is a first predefined number of degrees from a previous phase shift value in a direction of a first phase shift corresponding to the first phase difference; or determining, if the second measurement is higher than the first measurement, that the phase shift value is a second predefined number of degrees from the previous phase shift value in a direction of a second phase shift corresponding to the second phase difference.

6. The apparatus of claim 1, further configured to:

receive one or more additional measurements after setting the phase shifter based on the phase shift value; and determine to update the phase shift value at predefined intervals or upon determining, based on the one or more additional measurements, a decline in reception quality.

7. The apparatus of claim 1, wherein the second transmission channel comprises a delay element.

8. An apparatus comprising:

a modulator;

a first transmission channel configured to couple the modulator to a first antenna pointed at a satellite; and a second transmission channel comprising at least a delay element and a phase shifter and configured to couple the modulator to a second antenna pointed at the satellite, wherein the apparatus is configured to:

transmit, via the first transmission channel and via the first antenna, a first transmission;

transmit, via the second transmission channel and via the second antenna, a second transmission;

record a time difference between transmitting the first transmission and transmitting the second transmission;

receive a time difference and a phase difference of the first transmission and the second transmission;

calculate a delay error based on a difference between the received time difference and the recorded time difference;

calculate a phase error based on the received phase difference;

adjust the delay element based on the delay error; and adjust the phase shifter based on the phase error.

9. The apparatus of claim 8, wherein:

the first transmission comprises a first unique word (UW);

the second transmission comprises a second UW; and the apparatus is configured to record the time difference by recording the time difference between transmission of the first UW and transmission of the second UW.

10. The apparatus of claim 9, wherein the second UW and the first UW comprise a same sequence of symbols, and the apparatus is configured to transmit the second UW after concluding the transmission of the first UW.

11. The apparatus of claim 9, wherein the second UW comprises a sequence of symbols nearly orthogonal to a sequence of symbols of the first UW, and wherein the apparatus is configured to transmit the first UW and the second UW at about a same time.

12. A method, comprising:

transmitting, from a terminal, a first transmission via a first transmission channel and via a first antenna coupled to the first transmission channel;

transmitting, from the terminal, a second transmission via a second transmission channel and via a second antenna coupled to the second transmission channel;

recording, at the terminal, a time difference between the transmitting of the first transmission and the transmitting of the second transmission;

receiving, at the terminal, a time difference and a phase difference of the first transmission and the second transmission;

calculating a delay error based on a difference between the received time difference and the recorded time difference;

calculating a phase error based on the received phase difference;

adjusting a delay element of the second transmission channel based on the delay error; and adjusting a phase shifter of the second transmission channel based on the phase error.

13. The method of claim 12, wherein:

the first transmission comprises a first unique word (UW);

the second transmission comprises a second UW; and the recording of the time difference comprises recording the time difference between transmitting the first UW and transmitting the second UW.

14. The method of claim 13, wherein the second UW and the first UW comprise a same sequence of symbols, and wherein the second transmission is transmitted after concluding the transmitting of the first transmission.

15. The method of claim 13, wherein the second UW comprises a sequence of symbols nearly orthogonal to a sequence of symbols of the first UW, and wherein the second transmission is transmitted at about a same time as the transmitting of the first transmission.

16. The method of claim 12, wherein:

the adjusting the delay element comprises subtracting the delay error from a delay value of the delay element; and the adjusting the phase shifter comprises subtracting the phase error from a phase shift value of the phase shifter.

17. A method comprising:

transmitting, from a terminal, a first combined transmission having a first phase difference;

receiving, at the terminal, a first measurement of the first combined transmission;

transmitting, from the terminal, a second combined transmission having a second phase difference;

receiving, at the terminal, a second measurement of the second combined transmission;

determining, at the terminal, a phase shift value based on at least one of the first measurement or the second measurement; and based on the phase shift value, setting a phase shifter to implement a phase difference between signals transmitted via a first transmission channel and a second transmission channel.

18. The method of claim 17, wherein:

the second phase difference is different from the first phase difference; and the first measurement or the second measurement comprises a Signal to Noise Ratio (SNR) measurement or a Received Signal Strength Indication (RSSI) measurement.

19. The method of claim 17, wherein the determining of the phase shift value comprises determining the phase shift value based on a previous phase shift value.

20. The method of claim 17, wherein the determining of the phase shift value comprises:

determining whether the first measurement is higher than the second measurement; and determining, if the first measurement is higher than the second measurement, that the phase shift value is a first predefined number of degrees from a previous phase shift value in a direction of a first phase shift corresponding to the first phase difference; or determining, if the second measurement is higher than the first measurement, that the phase shift value is a second predefined number of degrees from the previous phase shift value in a direction of a second phase shift corresponding to the second phase difference.

21. The method of claim 17, wherein the method comprises generating at the terminal a first radio frequency (RF) signal and a second RF signal, wherein the transmitting the first combined transmission comprises:

transmitting a first replica of the first RF signal via the first transmission channel of the terminal, and transmitting a second replica of the first RF signal via the second transmission channel of the terminal, and wherein the transmitting the second combined transmission comprises:

transmitting a first replica of the second RF signal via the first transmission channel, and transmitting a second replica of the second RF signal via the second transmission channel.

* * * * *